Dec. 6, 1938.   T. LOIBL   2,138,929
DEVICE FOR PREVENTING OVERFLOWING, ESPECIALLY DESIGNED FOR FUNNELS
Filed July 27, 1937
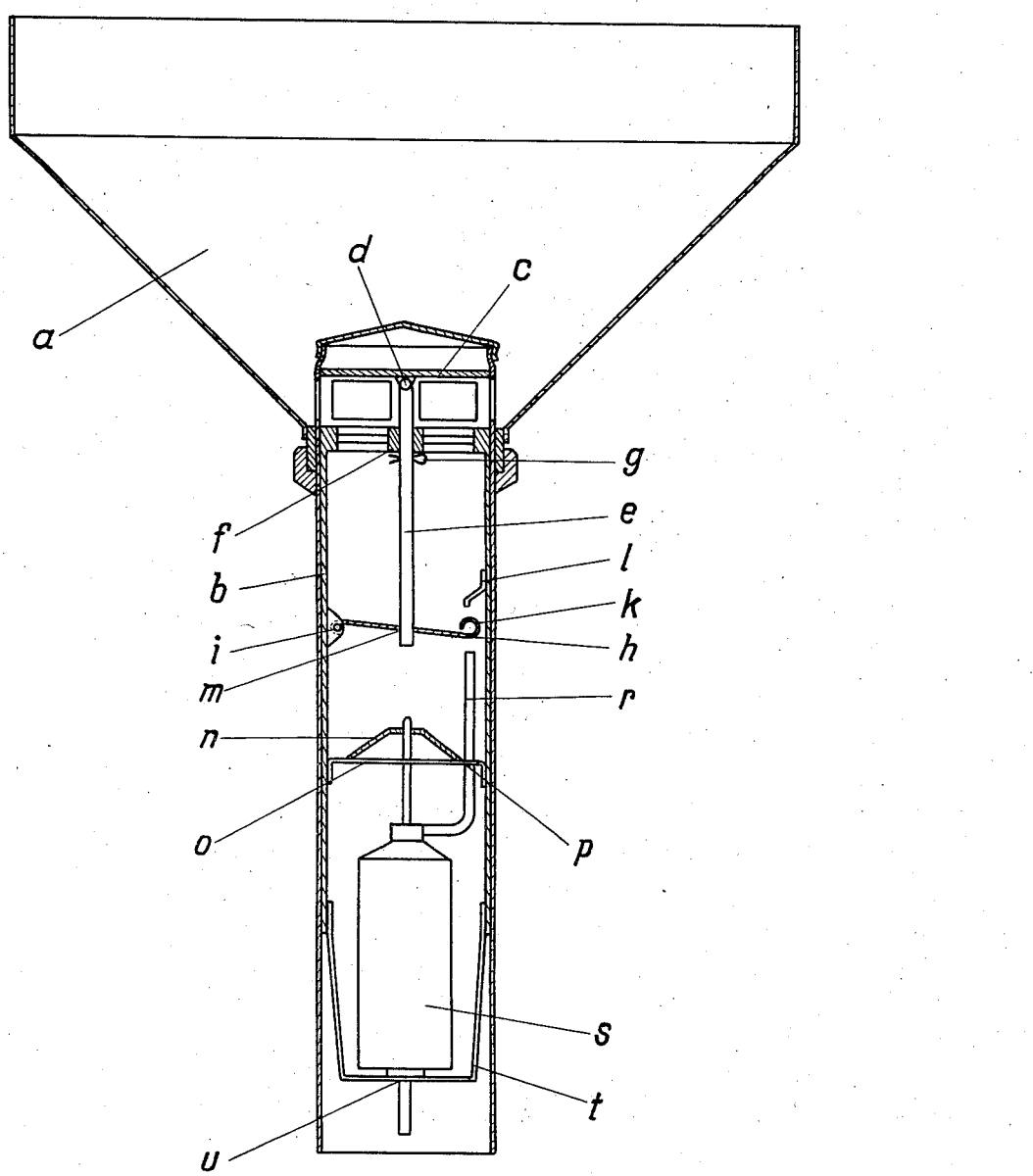
Inventor:
Toni Loibl Patented Dec. 6, 1938

2,138,929

UNITED STATES PATENT OFFICE 2,138,929

DEVICE FOR PREVENTING OVERFLOWING, ESPECIALLY DESIGNED FOR FUNNELS

Toni Loibl, Berlin-Tempelhof, Germany

Application July 27, 1937, Serial No. 155,897
In Germany July 30, 1936

3 Claims. (Cl. 226—37)

This invention relates to a device for preventing overflowing, by which, when liquids are poured in or transferred, the overflowing is securely and positively prevented. This is of great importance in pouring liquids, especially explosive liquid substances such as fuels, from one vessel into another, as the commonly used funnel often overflows, this being rather dangerous for the surroundings. By the use of the device for preventing overflowing a saving is further obtained, as liquid can no longer get lost by overflowing. The new device for preventing overflowing may be used with advantage also where up to the present shutting off valves, cocks and the like have been employed. The range of application of the device for preventing overflowing according to the invention is practically almost unlimited.

An embodiment of the invention is illustrated, by way of example, in the only figure of the accompanying drawing, which shows the device mounted in a funnel.

At the upper end of the tubular part $b$ of the device, a pressure intercepting device is arranged. The device proper for preventing overflowing consists of a plate $c$ which is connected by a ball joint $d$ with a rod $e$ held in a guide piece $f$. A split pin $g$ is inserted in rod $e$. The lower end of rod $e$ extends through a flap $h$ hingedly mounted at $i$ and having on its free end a counterweight $k$ which, when the flap is being moved upwards, strikes against an abutment $l$. The aperture $m$ in the hingedly mounted flap $h$ through which the rod $e$ extends is adapted to clamp or release the rod according to the position of the flap $h$. The device $n$ for intercepting the pressure of the liquid is mounted on a transverse bar $o$ which serves at the same time as upper guide for a float $s$ and for a releasing lever $r$ which is slidably guided in the transverse bar $o$ at $p$. A strap $t$ has an aperture $u$ in which a rod extending from the lower end of a float $s$ is guided. A rod-shaped extension at the upper end of the float $s$ is adjusted so that it can engage into the lower hollow portion of rod $e$ when the float $s$ ascends.

The device for preventing overflowing according to the invention can be inserted for instance into the tube of a funnel as shown in the drawing. The shield-shaped pressure intercepting device extends into part $a$ of the funnel, whereas the tubular part $b$ serves as outflow tube of the funnel. The device for preventing overflowing according to the invention can be inserted into the mouth piece of a hose, the other end of which hose is inserted for instance into a benzene tank. As soon as the tank is full, the device automatically shuts off and overflowing is prevented.

The new device is employed in the following manner:—

The lid $c$ is opened by a short jerk-like movement so that the liquid can freely flow into the vessel to be filled. As soon as the liquid in the vessel has risen to the desired maximum level it lifts the float $s$ and the releasing lever $r$ which is rigidly connected with the float is pressed against and lifts flap $h$ so that the rod $e$ is liberated and thus brings the lid $c$ into its closing position. No liquid can then flow into the vessel.

The releasing position of flap $h$ is attained in any case, as the rod $e$ must slip through the aperture $m$ of flap $h$ at the moment when this flap is pushed upward by the releasing lever $r$, so that rod $e$ is no longer clamped in $m$.

The device is preferably made of non-rusting or or non-oxidizing material. The floating body $s$ may be made of cork or of any other floatable material or it may be a hollow body of suitable material, especially light metal.

I claim:—

1. A device for preventing overflowing, comprising in combination with a funnel, a tube inserted in said funnel, a lid vertically slidable in the upper end of said tube, a rod hingedly mounted on the underside of said lid, a flap hingedly mounted in said tube and having an aperture for said rod, the edges of said aperture constituting a friction clamping means for maintaining said rod in raised position when said flap is downwardly inclined, a float in the lower portion of said tube, a transverse bar fixed in said tube above said float and having a hole, a vertical arm upwardly extending from said float through said hole of said transverse bar and adapted to lift said flap and to liberate said rod to shut said lid.

2. A device for preventing overflowing, as specified in claim 1, in which the lid is fixed on the rod by a ball joint.

3. A device for preventing overflowing as specified in claim 1, comprising two devices for intercepting pressure by the liquid, one device on the upper end of the tube and the other on the transverse bar above the float.

TONI LOIBL.